US011330193B2

(12) United States Patent
Bardagjy et al.

(10) Patent No.: US 11,330,193 B2
(45) Date of Patent: *May 10, 2022

(54) IMAGING DEVICE BASED ON LENS ASSEMBLY WITH EMBEDDED FILTER

(71) Applicant: Facebook Technologies, LLC, Menlo Park, CA (US)

(72) Inventors: Andrew Matthew Bardagjy, Seattle, WA (US); Joseph Duggan, San Francisco, CA (US); Cina Hazegh, Walnut Creek, CA (US); Fei Liu, San Jose, CA (US); Mark Timothy Sullivan, Mountain View, CA (US); Simon Morris Shand Weiss, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/004,323

(22) Filed: Aug. 27, 2020

(65) Prior Publication Data

US 2020/0396362 A1 Dec. 17, 2020

Related U.S. Application Data

(63) Continuation of application No. 15/694,480, filed on Sep. 1, 2017, now Pat. No. 10,791,283.

(51) Int. Cl.
*H04N 5/238* (2006.01)
*H04N 5/225* (2006.01)
(Continued)

(52) U.S. Cl.
CPC ............. *H04N 5/238* (2013.01); *G02B 5/281* (2013.01); *G02B 27/425* (2013.01); *G06T 7/521* (2017.01);
(Continued)

(58) Field of Classification Search
CPC .. H04N 5/2226; H04N 5/2254; H04N 5/2256; H04N 5/2351; H04N 5/2354;
(Continued)

(56) References Cited

U.S. PATENT DOCUMENTS

6,647,350 B1 11/2003 Palfenier et al.
8,786,686 B1 7/2014 Amirparviz
(Continued)

*Primary Examiner* — Jessica M Prince
(74) *Attorney, Agent, or Firm* — Fenwick & West LLP (57) ABSTRACT

An imaging device for imaging of a local area surrounding the imaging device. The imaging device includes a lens assembly, a filtering element and a detector. The lens assembly is configured to receive light from a local area surrounding the imaging device and to direct at least a portion of the received light to the detector. The filtering element is placed in the imaging device within the lens assembly such that light is incident at a surface of the filtering element within a range of angles determined by a design range of angles at which the filtering element is designed to filter light. The detector is configured to capture image(s) of the local area including the filtered light. The imaging device can be integrated into a depth camera assembly for determining depth information of object(s) in the local area based on the captured image(s).

20 Claims, 5 Drawing Sheets

(51) Int. Cl.
*G06T 7/521* (2017.01)
*H04N 5/235* (2006.01)
*G02B 5/28* (2006.01)
*G02B 27/42* (2006.01)
*G06T 7/55* (2017.01)

(52) U.S. Cl.
CPC .......... *H04N 5/2254* (2013.01); *H04N 5/2256* (2013.01); *H04N 5/2351* (2013.01); *H04N 5/2354* (2013.01); *G06T 7/55* (2017.01); *G06T 2207/10028* (2013.01); *G06T 2207/10152* (2013.01)

(58) Field of Classification Search
CPC .......... H04N 5/238; G06T 2207/10028; G06T 2207/10152; G06T 7/521; G06T 7/55; G02B 2027/0138; G02B 2027/014; G02B 27/0172; G02B 27/425; G02B 5/281
See application file for complete search history.

(56) References Cited

U.S. PATENT DOCUMENTS

| | | | |
|---|---|---|---|
| 9,360,366 | B1 | 6/2016 | Tran |
| 9,858,672 | B2 * | 1/2018 | Trail ................ G06T 7/521 |
| 10,469,722 | B2 * | 11/2019 | Trail ................ G06F 3/011 |
| 2006/0018233 | A1 | 1/2006 | Makela et al. |
| 2008/0123097 | A1 | 5/2008 | Muhammed et al. |
| 2010/0060962 | A1 | 3/2010 | Rosen |
| 2013/0050432 | A1 * | 2/2013 | Perez ................ G06F 3/017 |
| | | | 348/47 |
| 2016/0274679 | A1 | 9/2016 | Romano et al. |
| 2017/0142312 | A1 | 5/2017 | Dal Mutto et al. |
| 2017/0289524 | A1 * | 10/2017 | Pacala ............ H04N 13/218 |
| 2018/0106936 | A1 | 4/2018 | Heshmat Dehkordi et al. |

* cited by examiner

IMAGING DEVICE BASED ON LENS ASSEMBLY WITH EMBEDDED FILTER

CROSS REFERENCE TO RELATED APPLICATIONS

This application is a continuation of co-pending U.S. application Ser. No. 15/694,480, filed Sep. 1, 2017, which is incorporated by reference in its entirety.

BACKGROUND

The present disclosure generally relates to an imaging device, and specifically relates to an imaging device that includes a lens assembly with an embedded filter.

An imaging device (camera or sensor), e.g., employed for depth sensing in augmented reality (AR) and virtual reality (VR) systems, typically utilizes a two-dimensional pixel array detector to measure and record light back-scattered from one or more objects in a scene. Other methods for depth sensing are based on a time-of-flight technique, which measures a round trip travel time-of-light projected into the scene and returning to pixels on a sensor array. In general, an imaging device captures images of a scene based on light coming from one or more objects in the scene being detected by one or more pixels of a detector included in the imaging device. The problem related to operation of an imaging device is related to designing a compact and efficient camera that can produce quality images in both indoor and outdoor environments where background ambient light can strongly interfere with measurements. Thus, light received by the imaging device needs to be efficiently filtered within an assembly of the imaging device in order to block undesired light components, e.g., background ambient light and/or light of specific band(s).

SUMMARY

An imaging device is presented herein. The imaging device includes a lens assembly, a filtering element and a detector. The lens assembly is configured to receive light from a local area surrounding the imaging device and to direct at least a portion of the received light to the detector. The filtering element is placed in the imaging device within the lens assembly such that light is incident at a surface of the filtering element within a range of angles, wherein the range of angles is determined by a design range of angles at which the filtering element is designed to filter light. The detector is configured to capture one or more images of the local area including the filtered light. In some embodiments, the lens assembly generates collimated light using the received light, the collimated light composed of light rays substantially parallel to an optical axis. The surface of the filtering element is perpendicular to the optical axis, and the collimated light is incident on the surface of the filtering element. The filtering element may be configured to reduce an intensity of a portion of the collimated light to generate the filtered light.

A depth camera assembly (DCA) can integrate the imaging device. The DCA determines depth information associated with one or more objects in a local area. The DCA further comprises a light generator and a controller coupled to the light generator and the imaging device. The light generator is configured to illuminate the local area with illumination light in accordance with emission instructions. The controller generates the emission instructions and provides the emission instructions to the light generator. The controller further determines depth information for the one or more objects based in part on the captured one or more images.

A head-mounted display (HMD) can further integrate the DCA with the imaging device. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. The optical assembly is configured to direct the image light to an eye-box of the HMD corresponding to a location of a user's eye, the image light comprising the depth information of the one or more objects in the local area determined by the DCA.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

An imaging device (camera) presented herein includes a lens assembly with a plurality of lens elements and a filtering element (e.g., an interference filter). The filtering element is configured to pass a particular band or bands of light received by the imaging device. However, often times, the filtering element may be of a type that operates with a designed passband for light incident within a particular range of angles to a surface of the filtering element. For example, in some embodiments, the filtering element may operate with the designed passband on light having incidence that is substantially perpendicular to a surface of the filtering element, e.g., ±5 degrees from normal incidence.

For a dichroic (interference) filtering element, a passband of the filtering element (i.e., filter edges) may shift when the filtering element operates on light having an angle of incidence (AOI) that substantially deviates from a desired AOI for which the filtering element is designed, e.g., when the AOI deviates by more than ±5 degrees from normal incidence. In this case, the filtering element would not pass desired wavelength(s) of received light as the passband of the filtering element has been shifted to another band that typically does not overlap with a desired band. To avoid the filter edge shifting due to incident light impinging on a surface of the filtering element away from its designed AOI (e.g., normal incidence), the filtering element is placed within the lens assembly of the imaging device where optical rays of the received light incident on the surface of the filtering element are impinging substantially at the designed AOI of the filtering element, e.g., within ±5 degrees from the designed AOI. The filtering element embedded at a preferred location into the camera propagates the optical rays in a particular desired band of light to generate filtered light. The filtering element presented herein also blocks some or all of the optical rays of other light band(s).

In some embodiments, the camera is integrated into a depth camera assembly (DCA). The DCA may further include an illumination source and a controller. The illumination source illuminates a local area surrounding some or all of the DCA with illumination light (e.g., structured light) in accordance with emission instructions from the controller. The camera captures one or more images of the local area including the filtered light. The controller determines depth information for one or more objects in the local area based in part on the captured one or more images.

In some embodiments, the DCA with the camera is integrated into a head-mounted display (HMD) that captures data describing depth information in the local area surrounding some or all of the HMD. The HMD may be part of, e.g., a virtual reality (VR) system, an augmented reality (AR) system, a mixed reality (MR) system, or some combination thereof. The HMD further includes an electronic display and an optical assembly. The electronic display is configured to emit image light. The optical assembly is configured to direct the image light to an eye-box of the HMD corresponding to a location of a user's eye, the image light comprising the depth information of the one or more objects in the local area determined by the DCA.

Figure 1:
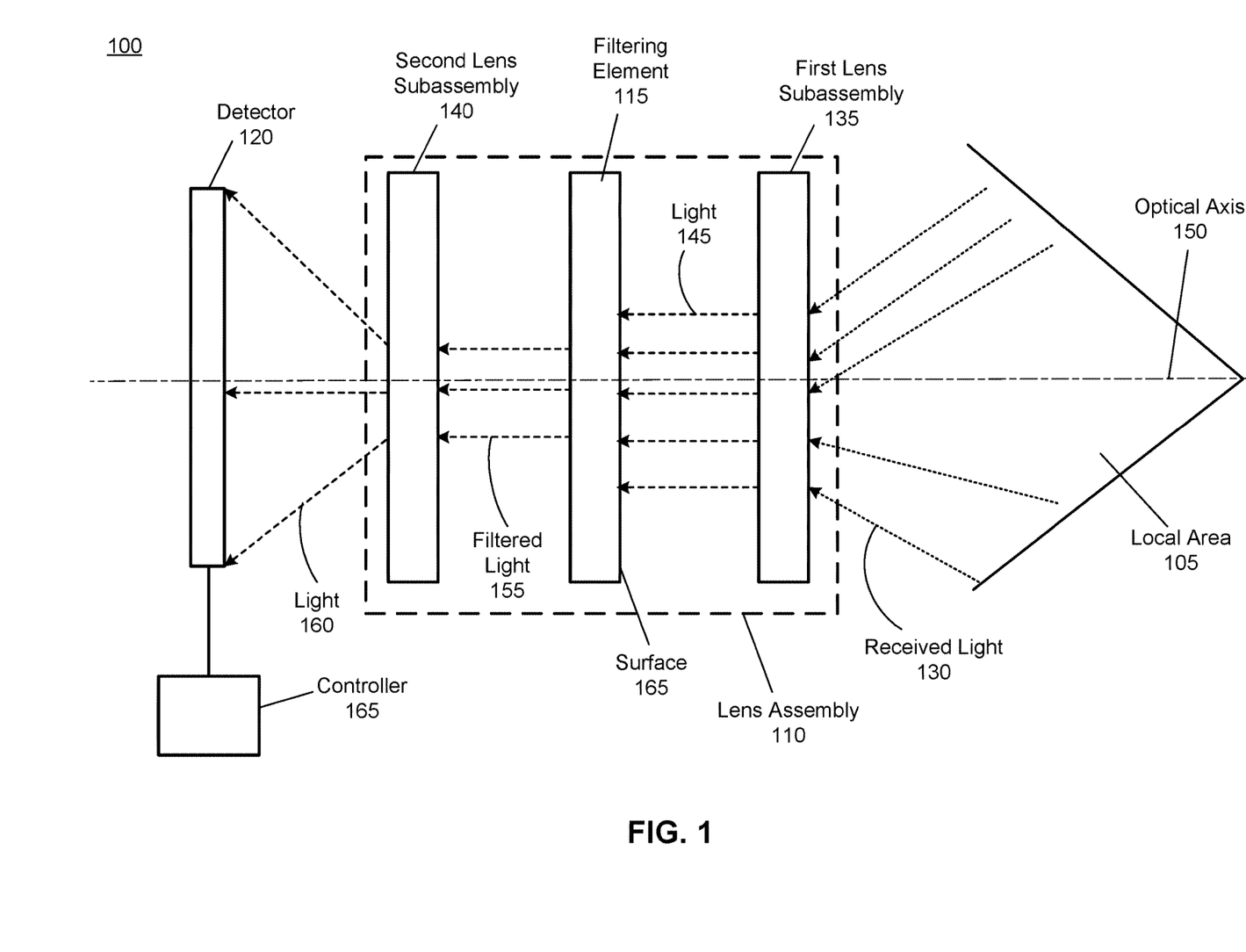
FIG. 1 is an example imaging device, in accordance with an embodiment.

FIG. 1 is an imaging device 100, in accordance with an embodiment. The imaging device 100 is configured for imaging of a local area 105 surrounding some or all of the imaging device 100. The imaging device 100 may be located in an indoor environment. Alternatively, the imaging device 100 may be located in an outdoor environment. The imaging device 100 includes a lens assembly 110, a filtering element 115, a detector 120, and a controller 125 coupled to the detector 120.

The lens assembly 110 receives light 130 coming from the local area 105. The lens assembly 110 includes a plurality of optical elements (e.g., lenses) encased in a housing (not shown). The plurality of optical elements are organized into at least a first lens subassembly 135 in optical series with a second lens subassembly 140, with the filtering element 115 there between. An air gap may exist between the first lens subassembly 135 and the second lens subassembly 140. The first lens subassembly 135 may include one or more optical elements (lenses, apertures, etc.) that generate light 145 using the received light 130. The light 145 generated by the first lens subassembly 135 is composed of light rays that are diverge and/or converge no more than a threshold value. The amount of divergence or convergence is based in part on a design range of angles of the filtering element 115 discussed below. In some embodiments, light rays of the light 145 are substantially parallel to an optical axis 150. The second lens subassembly 140 directs light toward the detector 120. The second lens subassembly 140 may include a prism (not shown in FIG. 1) or one or more other optical elements (lenses) that focus light toward a sensor area of the detector 120.

The filtering element 115 is configured to reduce an intensity of a portion of the light 145 to generate filtered light 155. In some embodiments, the filtering element 115 is implemented as an interference filter that passes a particular band of light. The filtering element 115 is positioned within the lens assembly 110, e.g., between the first lens subassembly 135 that generates the light 145 and the second lens subassembly 140 that directs the filtered light 155 toward the detector 120 as light 160.

The filtering element 115 is placed such that the light 145 is incident at a surface 165 of the filtering element 115 within a range of angles. And the range of angles is determined by a design range of angles at which the filtering element 115 is designed to filter light. The design range of angles for a typical infrared interference filter is approximately ±5 degrees from an angle of incidence (AOI) for which the filtering element 115 is designed. In the embodiment shown in FIG. 1, the AOI for which the filtering element 115 is designed is normal incidence. In this embodiment, the filtering element 115 is designed to filter light for a design range of angles of the light 145 whose center angle (i.e., angle between an axis perpendicular to a surface 165 of the filtering element 115 and a center axis of a cone of light whose apex is at the surface 165) is substantially perpendicular to the surface 165. In alternate embodiments, the filtering element 115 may be designed to operate at some other range of angles (e.g., 45±5 degrees, where 45 degrees is the center angle and an angle between a lateral surface of the cone and the apex of the cone is 5 degrees) of the light incident on the surface 165. And the filtering element 115 may be placed in the camera 100 such that the light 145 is incident within the design range of angles. It should be noted—that as a size of the design range of angles increases, the corresponding amount of collimation of the light 145 may decrease. For example, if the design range of angles as a center angle of 0 degrees and is ±0.1 degree, to have efficient operation of the filtering element 115 and avoid the filter edge shifting, the light 145 should be substantially collimated and incident within ±0.1 degree of normal to the surface 165. In contrast, if the design range of angles is ±15 degrees (again with a center angle of 0 degrees), efficient operation of the filtering element 115 without the filter edge shifting may be obtained with light that is not collimated and may be converging/diverging—so long as the light 145 is incident on the surface 165 at an angle within the design range of angles.

In FIG. 1, the light 145 has light rays substantially parallel to the optical axis 150 and is incident on the surface 165 of the filtering element. And the design range of angles of the filtering element 115 is such that for efficient operation without the filter edge shifting incident light should be at normal incidence. As the light 145 is substantially collimated, the filtering element 115 can efficiently pass a particular band of the light 145 and block undesired band(s) of the light 145. In one embodiment, the filtering element 115 is configured to pass a portion of the light 145 in a visible band. In another embodiment, the filtering element 115 is configured to pass a portion of the light 145 in an infrared band. In one embodiment, the surface 165 of the filtering element 115 is flat. In this case, the filtering element 115 may not add/subtract any optical power to/from the incident light 145. In another embodiment, the surface 165 is curved. In this case, the filtering element 115 may be configured to add/subtract a defined optical power to/from the incident light 145.

In some embodiments, the surface 165 of the filtering element 115 is coated (e.g., with a metal or dichroic coating) to reflect a portion of the light 145 having one or more wavelengths outside a defined band. The coated surface 165 of the filtering element 115 also propagates other portion of the light 145 having one or more other wavelengths within the defined band to generate the filtered light 155.

The detector 120 captures one or more images of the local area 105 including the filtered light 155 (i.e., the light 160 on a sensor surface of the detector 120). In one embodiment, the detector 120 is an infrared detector configured to capture images in an infrared band. In another embodiment, the detector 120 is configured to capture an image light of a visible band. The detector 120 may be implemented as a charge-coupled device (CCD) detector, a complementary metal-oxide-semiconductor (CMOS) detector or some other types of detectors (not shown in FIG. 1). The detector 120 may be configured to operate with a frame rate in the range of mHz to approximately 1 KHz when performing detection of objects in the local area 105. In some embodiments, the detector 120 is implemented as a two-dimensional pixel array for capturing light signals related to the filtered light 155. In other embodiments, the detector 120 is implemented as a single pixel detector for capturing light signals related to the filtered light 155 over a defined amount of time.

In some embodiments, the detector 120 is configured to capture the one or more images of the local area 105 by capturing, at each pixel of the detector 120, a light signal related to the filtered light 155 for each time instant of one or more time instants. A controller 165 coupled to the detector 120 may be configured to determine depth information for one or more object in the local area 105 based on one or more light signals related to the filtered light 155 captured at each pixel of the detector 120 during the one or more time instants.

In some embodiments, the received light 130 includes ambient light (not shown in FIG. 1) and a portion of illumination light (not shown in FIG. 1) reflected from one or more objects in the local area 105. The filtering element 115 may be configured to generate the filtered light 155 substantially composed of the portion of illumination light reflected from the one or more objects in the local area 105. The detector 120 may be configured to capture the portion of reflected illumination light. The controller 165 may be configured to determine depth information for the one or more objects in the local area 105 based in part on the captured portion of the reflected illumination light.

Figure 2:
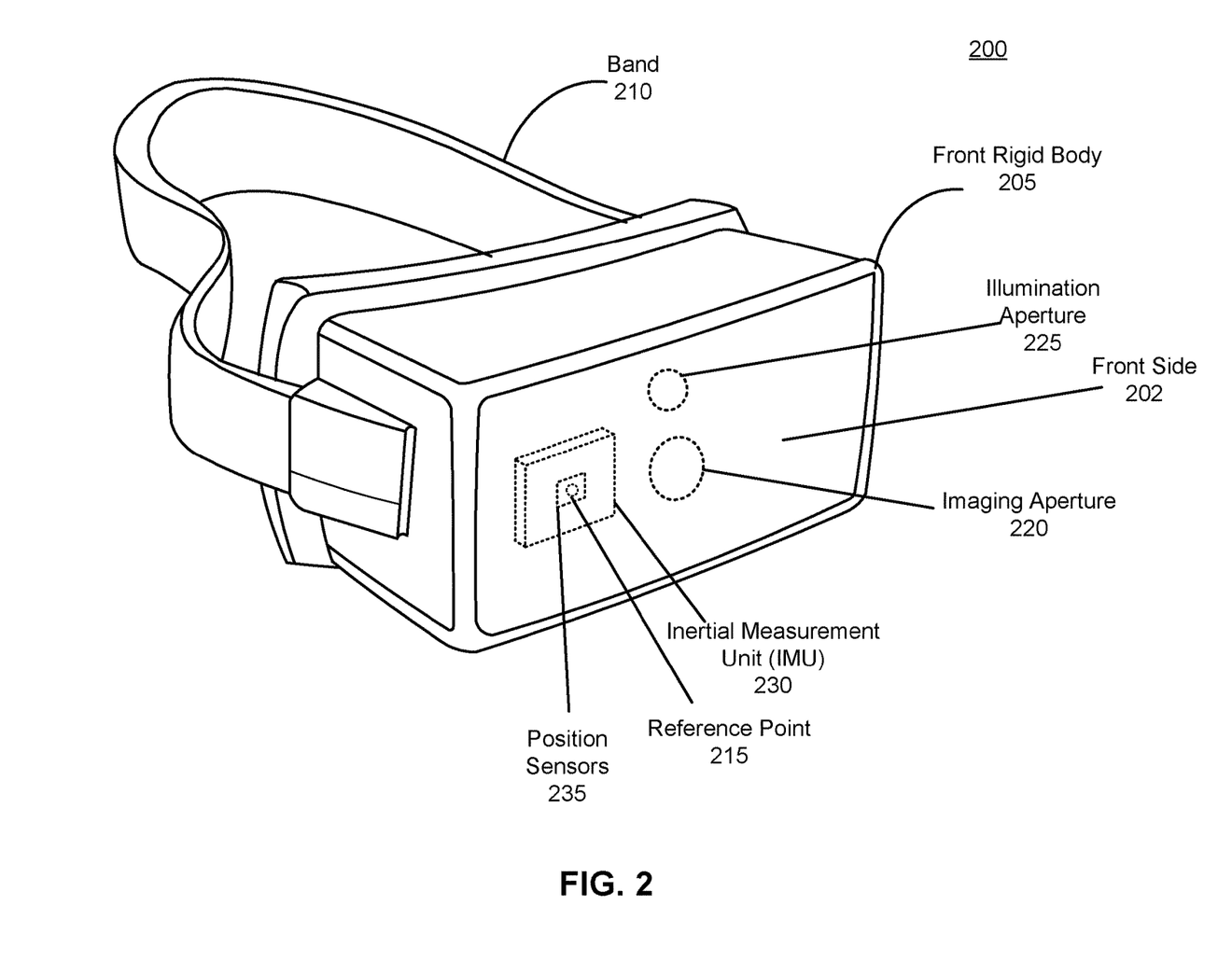
FIG. 2 is a diagram of a head-mounted display (HMD), which may include the imaging device in FIG. 1, in accordance with an embodiment.
Figure 3:
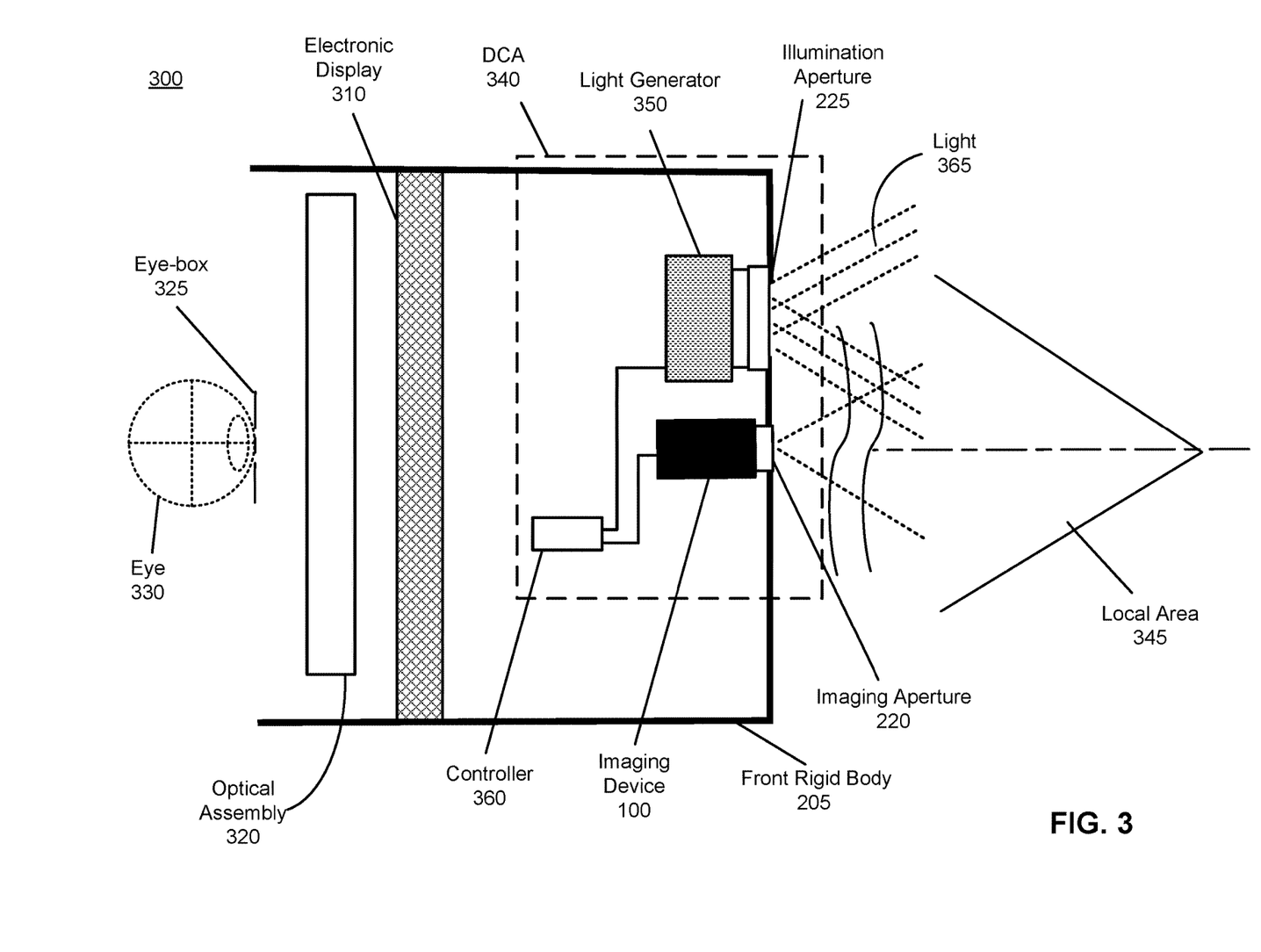
FIG. 3 is a cross section of a front rigid body of the HMD in FIG. 2, in accordance with an embodiment.
Figure 4:
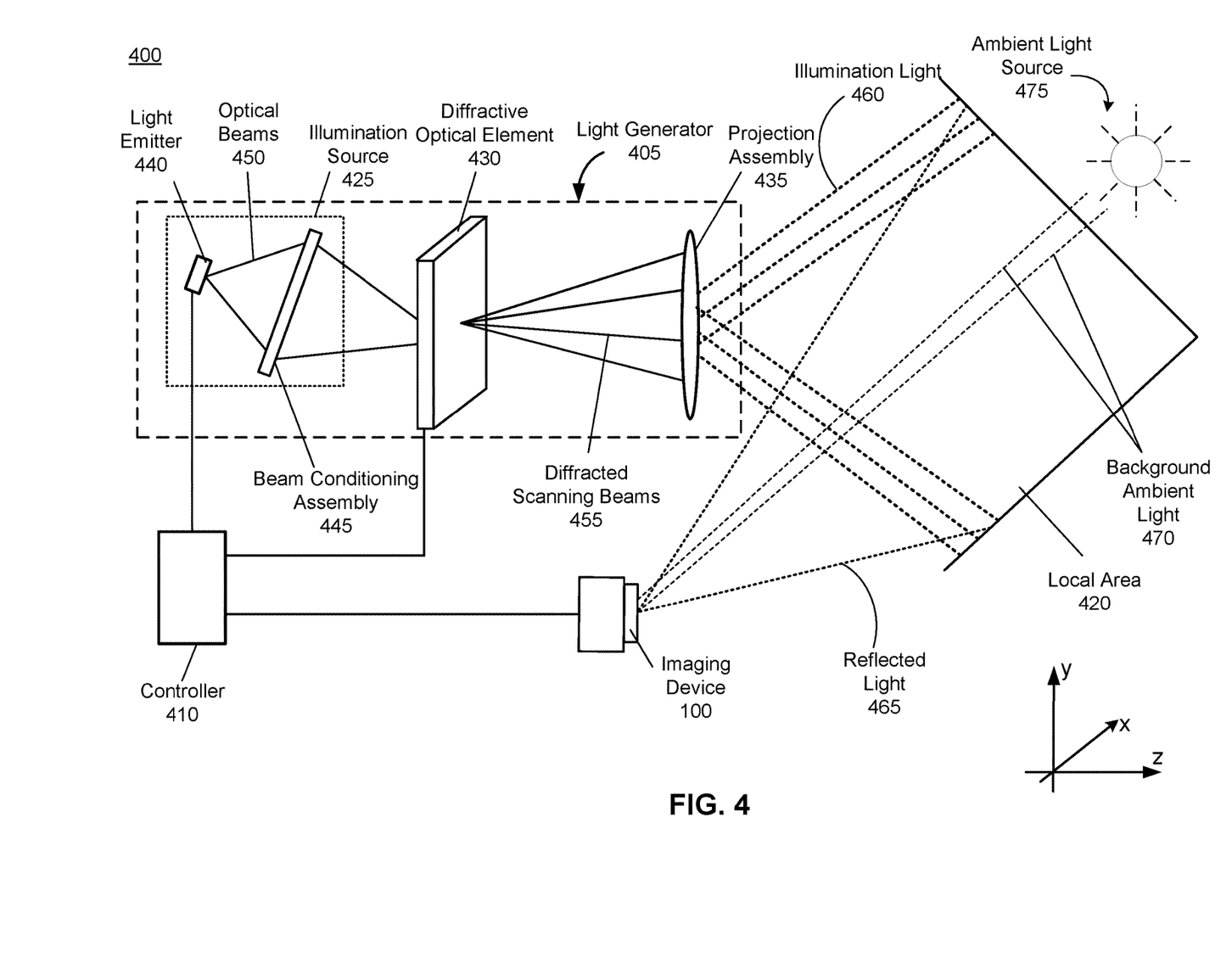
FIG. 4 is an example depth camera assembly (DCA), which may include the imaging device in FIG. 1, in accordance with an embodiment.

In some embodiments, the imaging device 100 can be a component of a DCA, as disclosed in conjunction with FIGS. 3-4. In some embodiments, the imaging device 100 can be a component of a HMD, as disclosed in conjunction with FIGS. 2-3.

FIG. 2 is a diagram of a HMD 200, in accordance with an embodiment. The HMD 200 may include the imaging device 100 (now shown in FIG. 2). The HMD 200 may be part of, e.g., a VR system, an AR system, a MR system, or some combination thereof. In embodiments that describe AR system and/or a MR system, portions of a front side 202 of the HMD 200 are at least partially transparent in the visible band (~380 nm to 750 nm), and portions of the HMD 200 that are between the front side 202 of the HMD 200 and an eye of the user are at least partially transparent (e.g., a partially transparent electronic display). The HMD 200 includes a front rigid body 205, a band 210, and a reference point 215. The HMD 200 also includes a DCA with the imaging device 100 configured to determine depth information of a local area surrounding some or all of the HMD 200. The HMD 200 also includes an imaging aperture 220 and an illumination aperture 225, and an illumination source of the DCA emits light (e.g., structured light) through the illumination aperture 225. The imaging device 100 of the DCA captures light from the illumination source that is reflected from the local area through the imaging aperture 220.

The front rigid body 205 includes one or more electronic display elements (not shown in FIG. 2), one or more integrated eye tracking systems (not shown in FIG. 2), an Inertial Measurement Unit (IMU) 230, one or more position sensors 235, and the reference point 215. In the embodiment shown by FIG. 2, the position sensors 235 are located within the IMU 230, and neither the IMU 230 nor the position sensors 235 are visible to a user of the HMD 200. The IMU 230 is an electronic device that generates fast calibration data based on measurement signals received from one or more of the position sensors 235. A position sensor 235 generates one or more measurement signals in response to motion of the HMD 200. Examples of position sensors 235 include: one or more accelerometers, one or more gyroscopes, one or more magnetometers, another suitable type of sensor that detects motion, a type of sensor used for error correction of the IMU 230, or some combination thereof. The position sensors 235 may be located external to the IMU 230, internal to the IMU 230, or some combination thereof.

FIG. 3 is a cross section 300 of the front rigid body 205 of the HMD 200 shown in FIG. 2. As shown in FIG. 3, the front rigid body 205 includes an electronic display 310 and an optical assembly 320 that together provide image light to an eye-box 325. The eye-box 325 is a region in space that is occupied by a user's eye 330. For purposes of illustration, FIG. 3 shows a cross section 300 associated with a single eye 330, but another optical assembly 320, separate from the optical assembly 320, provides altered image light to another eye of the user.

The electronic display 310 generates image light. In some embodiments, the electronic display 310 includes an optical element that adjusts the focus of the generated image light. The electronic display 310 displays images to the user in accordance with data received from a console (not shown in FIG. 3). In various embodiments, the electronic display 310 may comprise a single electronic display or multiple electronic displays (e.g., a display for each eye of a user). Examples of the electronic display 310 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 310 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 320 magnifies received light from the electronic display 310, corrects optical aberrations associated with the image light, and the corrected image light is presented to a user of the HMD 200. At least one optical element of the optical assembly 320 may be an aperture, a Fresnel lens, a refractive lens, a reflective surface, a diffractive element, a waveguide, a filter, or any other suitable optical element that affects the image light emitted from the electronic display 310. Moreover, the optical assembly 320 may include combinations of different optical elements. In some embodiments, one or more of the optical elements in the optical assembly 320 may have one or more coatings, such as anti-reflective coatings, dichroic coatings, etc. Magnification of the image light by the optical assembly 320 allows elements of the electronic display 310 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 320 is designed so its effective focal length is larger than the spacing to the electronic display 310, which magnifies the image light projected by the electronic display 310. Additionally, in some embodiments, the amount of magnification may be adjusted by adding or removing optical elements.

As shown in FIG. 3, the front rigid body 105 further includes a DCA 340 for determining depth information of one or more objects in a local area 345 surrounding some or all of the HMD 200. The DCA 340 includes the imaging device 100 shown in FIG. 1. The DCA 340 further includes a light generator 350, and a controller 360 that may be coupled to both the light generator 350 and the imaging device 100. The light generator 350 emits light through the illumination aperture 225. In accordance with embodiments of the present disclosure, the light generator 350 is configured to illuminate the local area 345 with light 365 in accordance with emission instructions generated by the controller 360.

The light generator 350 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the light generator 350 can emit one or more light beams. More details about the DCA 340 that includes the light generator 350 are disclosed in conjunction with FIG. 4.

The imaging device 100 integrated into the DCA 340 may be configured to capture, through the imaging aperture 220, at least a portion of the light 365 reflected from the local area 345. The imaging device 100 captures one or more images of one or more objects in the local area 345 illuminated with the light 365. The controller 360 coupled to the imaging device 355 is also configured to determine depth information for the one or more objects based on the captured portion of the reflected light. In some embodiments, the controller 360 provides the determined depth information to a console (not shown in FIG. 3) and/or an appropriate module of the HMD 200 (e.g., a varifocal module, not shown in FIG. 3). The console and/or the HMD 200 may utilize the depth information to, e.g., generate content for presentation on the electronic display 310.

In some embodiments, the front rigid body 205 further comprises an eye tracking system (not shown in FIG. 3) that determines eye tracking information for the user's eye 330. The determined eye tracking information may comprise information about an orientation of the user's eye 330 in an eye-box, i.e., information about an angle of an eye-gaze. An eye-box represents a three-dimensional volume at an output of a HMD in which the user's eye is located to receive image light. In one embodiment, the user's eye 330 is illuminated with structured light. Then, the eye tracking system can use locations of the reflected structured light in a captured image to determine eye position and eye-gaze. In another embodiment, the eye tracking system determines eye position and eye-gaze based on magnitudes of image light captured over a plurality of time instants.

In some embodiments, the front rigid body 105 further comprises a varifocal module (not shown in FIG. 3). The varifocal module may adjust focus of one or more images displayed on the electronic display 310, based on the eye tracking information. In one embodiment, the varifocal module adjusts focus of the displayed images and mitigates vergence-accommodation conflict by adjusting a focal distance of the optical assembly 320 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 360 to generate content for presentation on the electronic display 310.

FIG. 4 is an example DCA 400, in accordance with an embodiment. The DCA 400 is configured for depth sensing over a large field-of-view. The DCA 400 includes the imaging device 100 shown in FIG. 1. The DCA 400 further includes a light generator 405 and a controller 410 coupled to both the light generator 405 and the imaging device 100. The DCA 400 may be configured to be a component of the HMD 200 in FIG. 2. Thus, the DCA 400 may be an embodiment of the DCA 340 in FIG. 3, and the light generator 405 may be an embodiment of the light generator 350 in FIG. 3.

The light generator 405 is configured to illuminate and scan a local area 420 with illumination light in accordance with emission instructions from the controller 410. The light generator 405 may include an illumination source 425, a diffractive optical element (DOE) 430 and a projection assembly 435.

The illumination source 425 generates and directs light toward a portion of the DOE 430. The illumination source 425 includes a light emitter 440 and a beam conditioning assembly 445. The light emitter 440 is configured to emit one or more optical beams 450, based in part on the emission instructions from the controller 410. In some embodiments, the light emitter 440 includes an array of laser diodes that emit the one or more optical beams 450 in an infrared band. In other embodiments, the light emitter 440 includes an array of laser diodes that emit the one or more optical beams 450 in a visible band. In some embodiments, the light emitter 440 emits the one or more optical beams 450 as structured light of a defined pattern (e.g., dot pattern, or line pattern). Alternatively or additionally, the light emitter 440 emits the one or more optical beams 450 as temporally modulated light based in part on the emission instructions from the controller 410 to generate temporally modulated illumination of the local area 420, e.g., in addition to structured illumination.

The beam conditioning assembly 445 collects the one or more optical beams 450 emitted from the light emitter 440 and directs the one or more optical beams 450 toward at least a portion of the DOE 430. The beam conditioning assembly 445 is composed of one or more optical elements (lenses). In some embodiments, the beam conditioning assembly 445 includes a collimation assembly and a prism (not shown in FIG. 4). The collimation assembly includes one or more optical elements (lenses) that collimate the one or more optical beams 450 into collimated light. The prism is an optical element that directs the collimated light into the DOE 430. In alternate embodiments, the beam conditioning assembly 445 includes a single hybrid optical element (lens)

that both collimates the one or more optical beams 450 to generate collimated light and directs the collimated light into the portion of the DOE 430.

The DOE 430 generates diffracted scanning beams 455 from the one or more optical beams 450, based in part on the emission instructions from the controller 410. The DOE 430 may be implemented as: an acousto-optic device, a liquid crystal on Silicon (LCOS) device, a spatial light modulator, a digital micro-mirror device, a microelectromechanical (MEM) device, some other diffraction grating element, or combination thereof. In some embodiments, operation of the DOE 430 can be controlled, e.g., based in part on the emission instructions from the controller 410. For example, the controller 410 may control a voltage level applied to the DOE 430 or a radio frequency of a signal controlling a transducer of the DOE 430 (not shown in FIG. 4) to adjust a diffraction angle of the DOE 430 for generating the diffracted scanning beams 455 with a variable spatial resolution and/or variable field-of-view. Having ability to dynamically adjust a spatial resolution and/or a field-of-view of the diffracted scanning beams 455 (and of the illumination light 460) provides flexibility to scanning of different areas and various types of objects in the local area 420.

For a preferred diffraction efficiency, the DOE 430 may be configured to diffract the one or more optical beams 450 incident to at least a portion of the DOE 430 at an angle that satisfies the Bragg matching condition to form the diffracted scanning beams 455 based in part on the emission instructions from the controller 410. In some embodiments, the DOE 430 can be configured to generate the diffracted scanning beams 455 as polarized light (e.g., circularly polarized light) by orienting the one or more optical beams 450 to, e.g., a liquid crystal in the DOE 430 in a geometry satisfying the Bragg matching condition. Note that the diffracted scanning beams 450 can be either right handed circularly polarized or left handed circularly polarized based on the liquid crystal in the DOE 430. In some embodiments, a state of polarization (SOP) of the one or more optical beams 450 incident to the DOE 430 matches an eigenstate of polarization at the Bragg angle for achieving maximum diffraction efficiency of the DOE 430.

The projection assembly 435 is positioned in front of the DOE 430. The projection assembly 435 includes one or more optical elements (lenses). The projection assembly 435 projects the diffracted scanning beams 455 as the illumination light 460 into the local area 420, e.g., over a wide field-of-view. In some embodiments, the illumination light 460 is structured light of a defined pattern (e.g., dot pattern or line pattern). A pattern of the illumination light 460 may be dynamically adjustable over time based in part on the emission instructions from the controller 410 provided to the light emitter 440 and/or the DOE 430. The illumination light 460 illuminates portions of the local area 420, including one or more objects in the local area 420. As the pattern of the illumination light 460 is dynamically adjustable over time, different portions of the local area 420 may be illuminated in different time instants. Reflected light 465 may be generated based on reflection of the illumination light 465 from the one or more objects in the local area 420.

The imaging device 100 integrated into the DCA 400 captures one or more images of the one or more objects in the local area 420 by capturing at least a portion of the reflected light 465. The imaging device 100 receives the reflected light 465 and background ambient light 470. The background ambient light 470 is emitted from at least one ambient light source 475, e.g., sun in an outdoor environment or at least one lamp in an outdoor environment. In some embodiments, the background ambient light 470 reaching the imaging device 100 may be also reflected from the one or more objects in the local area 420. The filtering element 115 of the imaging device 100 in FIG. 1 propagates a portion of the reflected light 465 within a particular band (e.g., visible band, or infrared band) to the detector 120 (not shown in FIG. 4) of the imaging device 100. The filtering element 115 of the imaging device 100 is also configured to block or mitigate propagation of other portion of the reflected light 465 outside the particular band. The filtering element 115 of the imaging device 100 may be further configured to block or mitigate propagation of the ambient light 475. Thus, the imaging device 100 is configured to function as a band sensitive camera. Note that as described above with regard to FIG. 1, the filtering element 115 is positioned within a lens assembly of the camera 100 to receive light within a design range of angles. And accordingly, is able to efficiently filter light received from the local area 420.

In some embodiments, the imaging device 100 may further include a polarizing element (not shown in FIG. 4) placed in front of the detector 420 for receiving and propagating a portion of the reflected light 465 of a particular polarization. The polarizing element can be a linear polarizer, a circular polarizer, an elliptical polarizer, etc. The polarizing element can be implemented as a thin film polarizer (absorptive, reflective), a quarter wave plate combined with a linear polarizer, etc. The reflected light 465 may be selected from a group consisting of linearly polarized light (vertical and horizontal), right handed circularly polarized light, left handed circularly polarized light, and elliptically polarized light. Note that polarization of the reflected light 465 can be different than polarization of the illumination light 460 that illuminates the local area 420.

The controller 410 controls operations of various components of the DCA 400 in FIG. 4. In some embodiments, the controller 410 provides emission instructions to the light emitter 440 to control intensity of the emitted one or more optical beams 450, modulation (spatial, frequency, temporal, etc.) of the one or more optical beams 450, a time duration during which the light emitter 440 is activated, etc. The controller 410 may further create the emission instructions for controlling operations of the DOE 430 to dynamically adjust a pattern of the diffracted scanning beams 455 and a pattern the illumination light 460 that illuminates the local area 420. In some embodiments, the controller 410 can control, based in part on the emission instructions, operations of the DOE 430 such that intensity of the diffracted scanning beams 455 varies over time. In other embodiments, the controller 410 can control, based in part on the emission instructions, operations of the DOE 430 such that a phase of the diffracted scanning beams 455 varies over time.

In some embodiment, the DOE 430 is implemented as an acousto-optic device. The controller 410 may create the emission instructions which include a radio frequency at which the DOE 430 is driven. The controller 410 may generate the emission instructions based on, e.g., a predetermined list of values for the radio frequency stored in a look-up table of the controller 410. In an embodiment, the predetermined radio frequencies are stored as waveforms in an electronic chip, e.g., in a direct digital synthesizer (not shown in FIG. 4) coupled to the controller 410. In another embodiment, the emission instructions are created by a voice control integrated into the controller 410. Upon a verbal request, the voice control of the controller 410 computes a radio frequency for driving the DOE 430 to generate the diffracted scanning beams 455 and the illumination light 460 of a specific spatial frequency suitable for detection of stationary object(s) and/or tracking of moving object(s) in the local area 420 at a certain distance from the imaging device 100.

The controller 410 can modify the radio frequency at which the DOE 430 is driven to adjust a diffraction angle at which the one or more optical beams 450 are diffracted. In this way, the controller 410 can instruct the DOE 430 to scan a plurality of diffraction angles at which the one or more optical beams 450 are diffracted and interfered to form the diffracted scanning beams 455 and the illumination light 460 of a particular pattern. A radio frequency at which the DOE 430 is driven controls a separation of the optical beams 450 diffracted by the DOE 430. Hence, a spatial frequency of the resulting diffracted scanning beams 455 (and of the illumination light 460) directly depends on the radio frequency at which the DOE 430 is driven.

In some embodiments, the controller 410 controls a voltage level applied to the DOE 430 implemented as a LC-based diffractive optical element to dynamically vary a diffraction angle of the LC-based diffractive optical element to form the diffracted scanning beams 455 having a pattern that varies over time. In other embodiments, the controller 410 modifies over time a spatial frequency of a modulation signal applied to the optical beams 450 via the DOE 430 implemented as a spatial light modulator to dynamically adjust a pattern of the diffracted scanning beams 455 and a pattern of the illumination light 360. In yet other embodiments, the controller 410 dynamically reconfigures subsets of micro-mirror cells in the DOE 430. By reconfiguring, over a plurality of time instants, different subsets of the micro-mirror cells for absorption and reflection of incident light, the controller 410 dynamically adjusts a pattern of the diffracted scanning beams 455 and a pattern of the illumination light 460.

As shown in FIG. 4, the controller 410 is further coupled to the imaging device 100 and can be configured to determine depth information for the one or more objects in the local area 420. The controller 410 determines depth information for the one or more objects based in part on the one or more images captured by the imaging device 100. The controller 410 may be integrated into the imaging device 100. In this case, the controller 410 may be an embodiment of the controller 165 in FIG. 1.

The controller 410 may be configured to determine the depth information based on phase-shifted patterns of light captured by the imaging device 100 distorted by shapes of the one or more objects in the local area 420, and to use triangulation calculation to obtain a depth map of the local area 420. Alternatively, the controller 410 may be configured to determine the depth information based on time-of-flight information and information about a pattern of the reflected light 465 distorted by shapes of the one or more objects. In some embodiments, the controller 410 can be configured to determine the depth information based on polarization information of the reflected light 465 and/or polarization information of the illumination light 460.

In some embodiments, the DCA 400 is configured as part of a HMD, e.g., the HMD 200 in FIG. 2. In one embodiment, the DCA 400 provides the determined depth information to a console coupled to the HMD 200. The console is then configured to generate content for presentation on an electronic display of the HMD 200, based on the depth information. In another embodiment, the DCA 400 provides the determined depth information to a module of the HMD 200 that generates content for presentation on the electronic display of the HMD 200, based on the depth information. In an alternate embodiment, the DCA 400 is integrated into a HMD 200 as part of an AR system. In this case, the DCA 400 may be configured to sense and display objects behind a head of a user wearing the HMD 200 or display objects recorded previously. In yet other embodiment, the DCA 400 is integrated into a base station or a sensor bar external to the HMD 200. In this case, the DCA 400 may be configured to sense various body parts of a user wearing the HMD 200, e.g., the user's lower body. In yet other embodiment, the DCA 400 is configured as a stand-alone VR capture device. In some other embodiments, the DCA 400 is configured to determine eye tracking information (i.e., position and orientation) of one or both eyes of a user wearing the HMD 200 implemented as part of a VR system, an AR system, or a MR system.

System Environment

Figure 5:
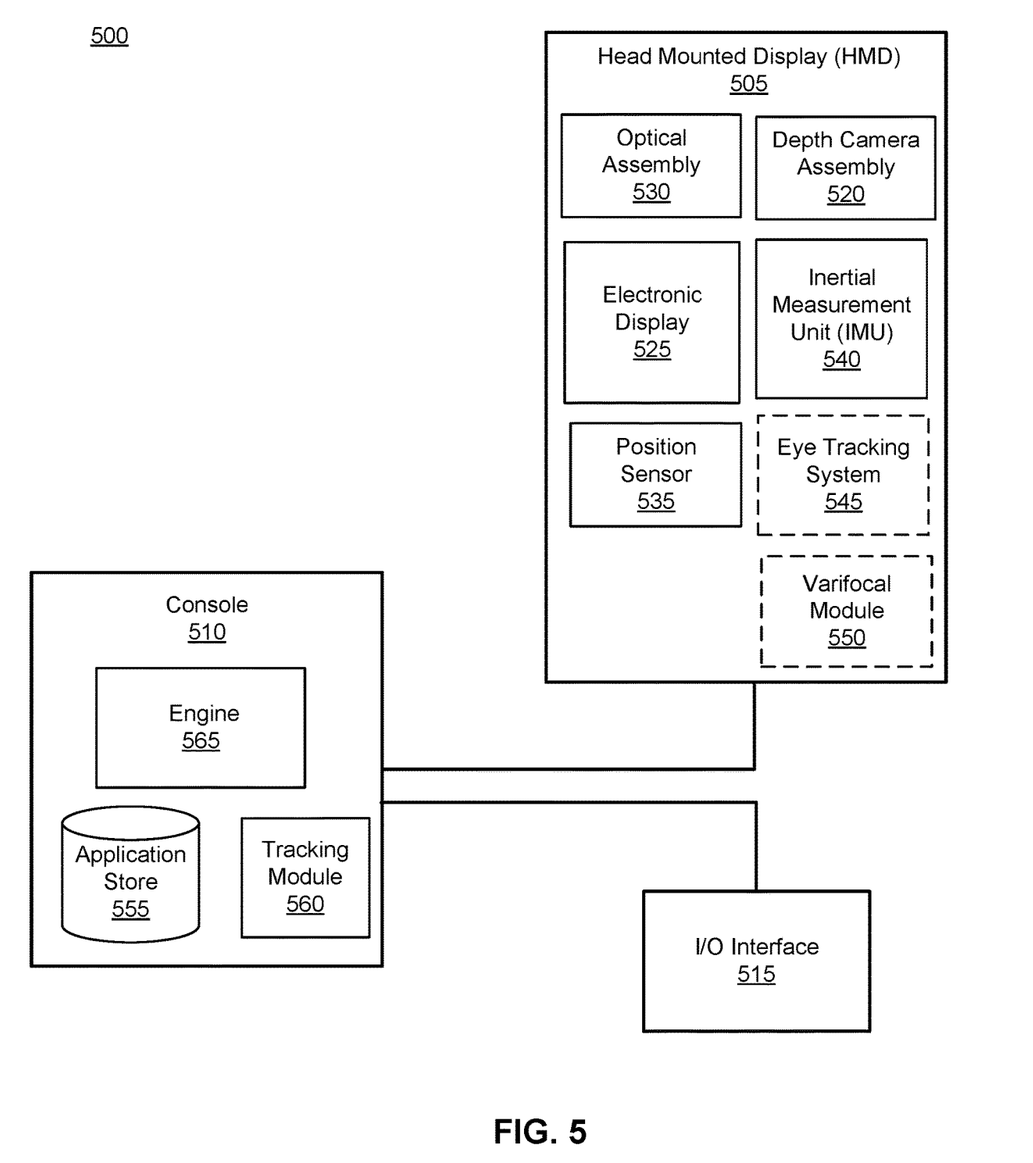
FIG. 5 is a block diagram of a HMD system in which a console operates, in accordance with an embodiment.

FIG. 5 is a block diagram of one embodiment of a HMD system 500 in which a console 510 operates. The HMD system 500 may operate in a VR system environment, an AR system environment, a MR system environment, or some combination thereof. The HMD system 500 shown by FIG. 5 comprises a HMD 505 and an input/output (I/O) interface 515 that is coupled to the console 510. While FIG. 5 shows an example HMD system 500 including one HMD 505 and on I/O interface 515, in other embodiments any number of these components may be included in the HMD system 500. For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 is the HMD 200 described above in conjunction with FIG. 2.

The HMD 505 includes a DCA 520, an electronic display 525, an optical assembly 530, one or more position sensors 535, an IMU 540, an optional eye tracking system 545, and an optional varifocal module 550. Some embodiments of the HMD 505 have different components than those described in conjunction with FIG. 5. Additionally, the functionality provided by various components described in conjunction with FIG. 5 may be differently distributed among the components of the HMD 505 in other embodiments.

The DCA 520 captures data describing depth information of a local area surrounding some or all of the HMD 505. The DCA 520 can compute the depth information using the data (e.g., based on a captured portion of a structured light pattern), or the DCA 520 can send this information to another device such as the console 510 that can determine the depth information using the data from the DCA 520.

The DCA 520 includes a light generator, an imaging device and a controller. The light generator of the DCA 520 is configured to illuminate the local area with illumination light in accordance with emission instructions. The imaging device of the DCA 520 includes a lens assembly, a filtering element and a detector. The lens assembly is configured to receive light from a local area surrounding the imaging device and to direct at least a portion of the received light to the detector. The filtering element may be placed in the imaging device within the lens assembly such that light is incident at a surface of the filtering element within a range of angles, wherein the range of angles is determined by a design range of angles at which the filtering element is designed to filter light. The detector is configured to capture one or more images of the local area including the filtered light. In some embodiments, the lens assembly generates collimated light using the received light, the collimated light composed of light rays substantially parallel to an optical axis. The surface of the filtering element is perpendicular to the optical axis, and the collimated light is incident on the surface of the filtering element. The filtering element may be configured to reduce an intensity of a portion of the collimated light to generate the filtered light. The controller of the DCA 520 generates the emission instructions and provides the emission instructions to the light generator. The controller of the DCA 520 further determines depth information for the one or more objects based in part on the captured one or more images. The DCA 520 may be an embodiment of the DCA 340 in FIG. 3 or the DCA 400 in FIG. 4.

The electronic display 525 displays two-dimensional or three-dimensional images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof. In some embodiments, the electronic display 525 may represent the electronic display 310 in FIG. 3.

The optical assembly 530 magnifies image light received from the electronic display 525, corrects optical errors associated with the image light, and presents the corrected image light to a user of the HMD 505. The optical assembly 530 includes a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field-of-view of the content presented by the electronic display 525. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content. In some embodiments, the optical assembly 530 may represent the optical assembly 320 in FIG. 3.

The IMU 540 is an electronic device that generates data indicating a position of the HMD 505 based on measurement signals received from one or more of the position sensors 535 and from depth information received from the DCA 520. A position sensor 535 generates one or more measurement signals in response to motion of the HMD 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the HMD 505 relative to an initial position of the HMD 505. For example, the position sensors 535 include multiple accelerometers to measure translational motion (forward/back, up/down, left/right) and multiple gyroscopes to measure rotational motion (e.g., pitch, yaw, roll). In some embodiments, the position sensors 535 may represent the position sensors 235 in FIG. 2. In some embodiments, the IMU 540 rapidly samples the measurement signals and calculates the estimated current position of the HMD 505 from the sampled data. For example, the IMU 540 integrates the measurement signals received from the accelerometers over time to estimate a velocity vector and integrates the velocity vector over time to determine an estimated current position of a reference point on the HMD 505. Alternatively, the IMU 540 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 540 receives one or more parameters from the console 510. The one or more parameters are used to maintain tracking of the HMD 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the HMD 505, the IMU 540 may be a dedicated hardware component. In other embodiments, the IMU 540 may be a software component implemented in one or more processors. In some embodiments, the IMU 540 may represent the IMU 230 in FIG. 2.

In some embodiments, the eye tracking system 545 is integrated into the HMD 505. The eye tracking system 545 determines eye tracking information associated with an eye of a user wearing the HMD 505. The eye tracking information determined by the eye tracking system 545 may comprise information about an orientation of the user's eye, i.e., information about an angle of an eye-gaze. In some embodiments, the eye tracking system 545 is integrated into the optical assembly 530. An embodiment of the eye-tracking system 545 may comprise an illumination source and an imaging device (camera).

In some embodiments, the varifocal module 550 is further integrated into the HMD 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with at least one of the electronic display 525 and at least one optical element of the optical assembly 530. Then, the varifocal module 550 may be configured to adjust focus of the one or more images displayed on the electronic display 525 by adjusting position of at least one of the electronic display 525 and the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. In one embodiment, the varifocal module 550 may utilize the depth information obtained by the DCA 520 to, e.g., generate content for presentation on the electronic display 525.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the DCA 520, the HMD 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 560 calibrates the HMD system 500 using one or more calibration parameters and may adjust one or more calibration parameters to reduce error in determination of the position of the HMD 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the HMD 505 and/or an IMU 540 included in the I/O interface 515. Additionally, if tracking of the HMD 505 is lost (e.g., the DCA 520 loses line of sight of at least a threshold number of structured light elements), the tracking module 560 may re-calibrate some or all of the HMD system 500.

The tracking module 560 tracks movements of the HMD 505 or of the I/O interface 515 using information from the DCA 520, the one or more position sensors 535, the IMU 540 or some combination thereof. For example, the tracking module 550 determines a position of a reference point of the HMD 505 in a mapping of a local area based on information from the HMD 505. The tracking module 560 may also determine positions of the reference point of the HMD 505 or a reference point of the I/O interface 515 using data indicating a position of the HMD 505 from the IMU 540 or using data indicating a position of the I/O interface 515 from an IMU 540 included in the I/O interface 515, respectively. Additionally, in some embodiments, the tracking module 560 may use portions of data indicating a position or the HMD 505 from the IMU 540 as well as representations of the local area from the DCA 520 to predict a future location of the HMD 505. The tracking module 560 provides the estimated or predicted future position of the HMD 505 or the I/O interface 515 to the engine 555.

The engine 565 generates a 3D mapping of the area surrounding some or all of the HMD 505 (i.e., the "local area") based on information received from the HMD 505. In some embodiments, the engine 565 determines depth information for the 3D mapping of the local area based on information received from the DCA 520 that is relevant for techniques used in computing depth. The engine 565 may calculate depth information using one or more techniques in computing depth from structured light. In various embodiments, the engine 565 uses the depth information to, e.g., update a model of the local area, and generate content based in part on the updated model.

The engine 565 also executes applications within the HMD system 500 and receives position information, acceleration information, velocity information, predicted future positions, or some combination thereof, of the HMD 505 from the tracking module 560. Based on the received information, the engine 565 determines content to provide to the HMD 505 for presentation to the user. For example, if the received information indicates that the user has looked to the left, the engine 565 generates content for the HMD 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

In some embodiments, based on the eye tracking information (e.g., orientation of the user's eye) received from the eye tracking system 545, the engine 565 determines resolution of the content provided to the HMD 505 for presentation to the user on the electronic display 525. The engine 565 provides the content to the HMD 505 having a maximum pixel resolution on the electronic display 525 in a foveal region of the user's gaze, whereas the engine 565 provides a lower pixel resolution in other regions of the electronic display 525, thus achieving less power consumption at the HMD 505 and saving computing cycles of the console 510 without compromising a visual experience of the user. In some embodiments, the engine 565 can further use the eye tracking information to adjust where objects are displayed on the electronic display 525 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An imaging device comprising:
   a lens assembly configured to generate collimated light using light received from a local area, the collimated light including reflected illumination light and ambient light;
   a filtering element embedded within the imaging device at a location where light rays of the collimated light are incident to a surface of the filtering element within a range of angles around a center angle of incidence for which the filtering element is designed to reduce an intensity of incident light to generate filtered light without the ambient light; and
   a detector configured to capture one or more images of the local area including the filtered light.

2. The imaging device of claim 1, wherein the filtering element is configured to:
   block a portion of the collimated light having one or more wavelengths outside a defined band; and
   propagate other portion of the collimated light having one or more other wavelengths within the defined band to generate the filtered light.

3. The imaging device of claim 1, wherein the detector is further configured to:
   capture the one or more images by capturing, at each pixel of the detector, a light signal related to the filtered light for each time instant of one or more time instants.

4. The imaging device of claim 3, further comprising:
a controller coupled to the detector configured to determine depth information for the local area based on one or more light signals related to the filtered light captured at each pixel of the detector during the one or more time instants.

5. The imaging device of claim 1, wherein the center angle is an angle between an axis perpendicular to the surface of the filtering element and a center axis of a cone of light whose apex is at the surface of the filtering element.

6. The imaging device of claim 1, wherein an amount of collimation of the collimated light is inversely proportional to a size of the range of angles.

7. The imaging device of claim 1, wherein the surface of the filtering element is coated to reflect a portion of the collimated light having one or more wavelengths outside a defined band.

8. The imaging device of claim 1, wherein the surface of the filtering element is coated to propagate a portion of the collimated light having one or more wavelengths within a defined band to generate the filtered light.

9. The imaging device of claim 1, wherein the filtering element is embedded within the lens assembly.

10. The imaging device of claim 1, wherein the illumination light is temporally modulated.

11. The imaging device of claim 1, wherein the illumination light includes structured light.

12. The imaging device of claim 1, wherein the imaging device is a component of a depth camera assembly.

13. The imaging device of claim 1, wherein the imaging device is a component of a head-mounted display.

14. A method comprising:
generating collimated light using light received from a local area, the collimated light including reflected illumination light and ambient light;
generating filtered light without the ambient light using a filtering element embedded within an imaging device at a location where light rays of the collimated light are incident to a surface of the filtering element within a range of angles around a center angle of incidence for which the filtering element is designed to reduce an intensity of incident light; and
capturing, at a detector of the imaging device, one or more images of the local area including the filtered light.

15. The method of claim 14, further comprising:
blocking a portion of the collimated light having one or more wavelengths outside a defined band; and
propagating other portion of the collimated light having one or more other wavelengths within the defined band to generate the filtered light.

16. The method of claim 14, further comprising:
capturing the one or more images by capturing, at each pixel of the detector, a light signal related to the filtered light for each time instant of one or more time instants; and
determining depth information for the local area based on one or more light signals related to the filtered light captured at each pixel of the detector during the one or more time instants.

17. The method of claim 14, wherein the center angle is an angle between an axis perpendicular to the surface of the filtering element and a center axis of a cone of light whose apex is at the surface of the filtering element.

18. The method of claim 14, wherein an amount of collimation of the collimated light is inversely proportional to a size of the range of angles.

19. A head-mounted display (HMD) comprising:
a display configured to emit image light;
a light generator configured to illuminate a local area with illumination light in accordance with emission instructions;
a lens assembly configured to generate collimated light using light received from a local area, the collimated light including reflected illumination light and ambient light;
a filtering element embedded within the imaging device at a location where light rays of the collimated light are incident to a surface of the filtering element within a range of angles around a center angle of incidence for which the filtering element is designed to reduce an intensity of incident light to generate filtered light without the ambient light;
a detector configured to capture one or more images of the local area including the filtered light;
a controller configured to:
generate the emission instructions,
provide the emission instructions to the light generator, and
determine depth information for the local area using the captured one or more images; and
an optical assembly configured to direct the image light to an eye-box of the HMD corresponding to a location of a user's eye, the image light comprising the determined depth information.

20. The HMD of claim 19, wherein the surface of the filtering element is coated to reflect a portion of the collimated light having one or more wavelengths outside a defined band and to propagate another portion of the collimated light having one or more other wavelengths within the defined band to generate the filtered light.

* * * * *